United States Patent Office 3,669,630
Patented June 13, 1972

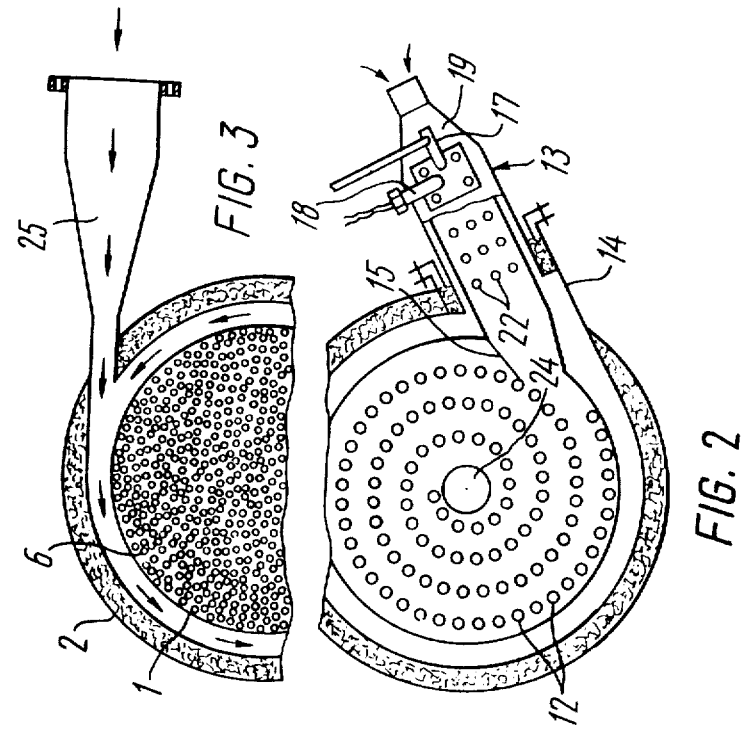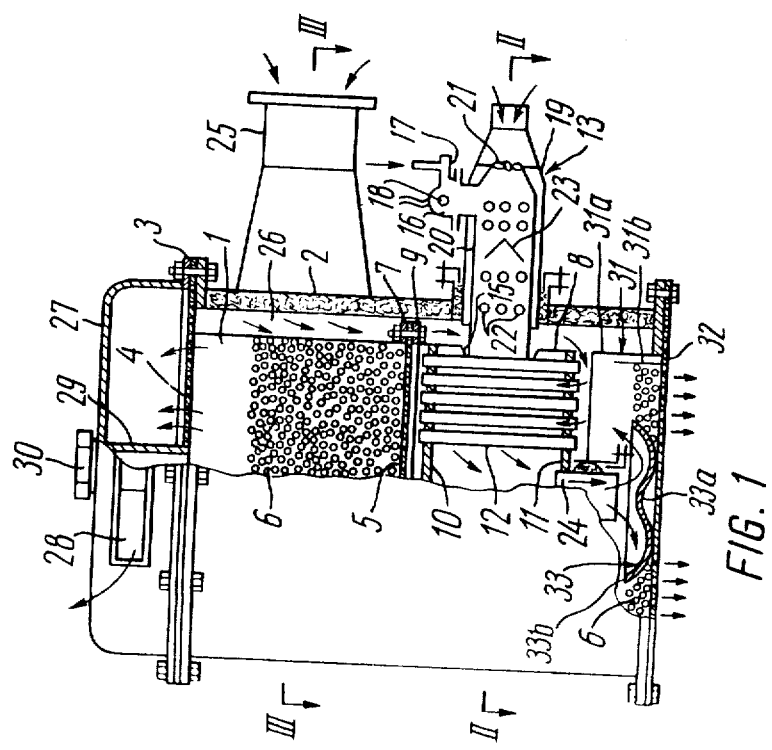

3,669,630
APPARATUS FOR THERMOCATALYTIC NEUTRALIZING OF EXHAUST GASES OF AN INTERNAL COMBUSTION ENGINE
Sergei Sergeevich Filatov, Ulitsa Belorechenskaya 36, kv. 4, and Mikhail Maximovich Konorev, Teatralny pereulok 5, kv. 2, both of Sverdlovsk, U.S.S.R.
Filed Feb. 12, 1970, Ser. No. 10,724
Int. Cl. B01j 9/04
U.S. Cl. 23—288 F       3 Claims

ABSTRACT OF THE DISCLOSURE

Apparatus for thermocatalytic neutralizing of the exhaust gases of an internal combustion engine comprises a separation chamber of a cyclone type, communicating at the upper portion thereof with the exhaust manifold of the associated internal combustion engine and also communicating at the lower portion thereof with the lower portion of a chamber receiving thereinside a supply of a catalyst, the last-mentioned chamber also communicating with ambient atmosphere. The communication between the separation chamber and the catalyst chamber includes a heat exchanger associated with a burner device for heating the exhaust gases by means of indirect heat exchange through tubular conveyers of the heat exchanger. The combustion products of the burner device are neutralized in an auxiliary catalyst chamber. There is no fluid communication between the burner device and the exhaust manifold of the engine, which makes it possible to reduce counter pressure in the exhaust manifold of the engine and improve the stability of the burner device operation.

---

The present invention relates to internal combustion engines, and, more particularly, to apparatus for thermocatalytic neutralizing of the exhaust gases of internal combustion engines.

A neutralizing apparatus, constructed in accordance with the present invention, is particularly suitable for association with diesel engines.

An apparatus for thermocatalytic neutralizing of the exhaust gases of an internal combustion engine is known, which comprises a separation chamber of a cyclone type, communicating at the upper portion thereof with the exhaust manifold of the engine, e.g. a diesel engine. The lower portion of this separation chamber communicates with the lower portion of a catalyst chamber, i.e. a chamber comprising a grid adapted to support thereon a supply of a granulated catalyst promoting oxidation of carbon monoxide or other toxic components. The communication between the separation chamber and the catalyst chamber includes means for introduction into the stream of the exhaust gases of combustion products supplied by a burner device including a fuel jet nozzle and communicating with a blower or a fan (see, for example, French Pat. No. 1,382,418, issued in 1963 and British Pat. No. 1,012,076, issued in 1965). As the stream of the exhaust gases passes through the granulated catalyst, the latter becomes suspended in this stream, which increases the degree of oxidation of the carbon monoxide present in the gases.

It is quite understandable that for the hereinabove specified known neutralizing apparatus to function normally, it is essential that the pressure of the air supplied to the burner device be higher than the maximal exhaust pressure of the diesel engine associated with the apparatus. However, when the last-mentioned requirement is satisfied, there is created in the apparatus an increased pressure opposing the progress of the exhaust gases of the engine toward ambient atmosphere. When these gases are being mixed with the combustion products coming from the burner, the latter is not infrequently extinguished. Consequently, a portion of the total horsepower of the engine is wasted in overpowering this counter-pressure.

It is an object of the present invention to obviate this shortcoming of the known neutralizing apparatus.

The present invention has for its aim the creation of an apparatus for thermocatalytic neutralizing of the exhaust gases of an internal combustion engine, wherein the combustion products supplied by the burner device do not come into direct contact with the exhaust gases of the engine.

This aim is attained in an apparatus for thermocatalytic neutralizing of the exhaust gases of an internal combustion engine, comprising a separation chamber of a cyclone separator kind, communicating at the upper portion thereof with the exhaust manifold of the engine and communicating at the lower portion thereof with the lower portion of a chamber adapted to receive therein a supply of catalyst, this last-mentioned catalyst chamber further communicating with the ambient atmosphere. In order to effect heating of the exhaust gases prior to their being introduced into the catalyst chamber, there is provided a burner device. In accordance with the present invention, in this neutralizing apparatus the communication between the separation chamber and the catalyst chamber includes a heat exchanger, wherein heat exchange between the combustion products supplied by the burner device and the exhaust gases of the engine is effected through the walls of this heat exchanger, while the combustion product outlet conduit of the heat exchanger communicates with the ambient atmosphere. Consequently, any direct contact of the combustion products and the exhaust gases within the apparatus is positively prevented.

In a preferred embodiment of the present invention, the heat exchanger of the neutralizing apparatus comprises a plurality of tubular members extending laterally in respect of the longitudinal axis of the burner device and arranged in succession along a helical line, the longitudinal axis of the burner device extending tangentially with respect to the peripheral portion of the helical line.

The last-mentioned feature provides for minimizing the aerodynamic resistance of the heat exchanger.

For neutralization of the carbon monoxide and other toxic components present in the combustion products coming from the burner device, there is provided in the outlet passage for the combustion products to an apparatus, constructed in accordance with a preferred embodiment of the present invention, and including an auxiliary chamber with an auxiliary supply of the catalyst.

It is also preferred for said auxiliary catalyst chamber to include a grid adapted to support thereon a supply of a granulated catalyst, and for this grid to be located after the outlet conduit of the heat exchanger. It is further preferred to mount a contoured plate-like element between the grid and the outlet conduit, this plate-like element having a central portion and a peripheral portion raised above the surface of the grid. The plate-like structure thus as a deflector, or baffle means, adapted to control the direction of the stream of the combustion products, coming from the heat exchanger structure, and to distribute this stream substantially uniformly over the catalyst-supporting grid.

It is a positive advantage of the present invention that with the counter pressure in the exhaust manifold of the engine reduced by approximately 40 percent, the operation stability of the burner device is ensured.

Given below is a detailed description of a preferred embodiment of the present invention in an apparatus for neutralizing the exhaust gases of an internal combustion engine by a thermocatalytic action, with due reference being had to the accompanying drawings, wherein:

FIG. 1 is a longitudinal sectional view of a neutralizing apparatus constructed in accordance with the present invention;

FIG. 2 is a cross-sectional view taken along line II—II of FIG. 1; and

FIG. 3 is a cross-sectional view taken along line III—III of FIG. 1.

Referring now in particular to the appended drawings, the thermocatalytic neutralizer of exhaust gases, embodying the invention, comprises a main catalyst chamber 1 (FIG. 1) disposed coaxially within a cylindrical housing 2 of the neutralizer, the chamber being mounted within the housing by attachment of the flanges 3 of the chamber wall to the housing. The catalyst chamber 1 is limited from above and from below by a pair of grids 4 and 5, respectively. The bottom grid 5 of the chamber supports a supply of a granulated catalyst 6 in the form of a multitude of spheres 3 mm. to 5 mm. in diameter, prepared from manganese ore and treated in a known manner, the surface of the spheres having a layer of either platinum or palladium coating applied thereon. A space is left between the top of the catalyst 6 in the chamber 1 and the top grid 4, this space being necessary for the spheres of the catalyst to acquire a suspended state in the stream of the exhaust gases of the associated internal combustion engine (not shown in the appended drawings), when the gases are passed through the neutralizer.

Attached to the bottom flange 7 of the wall of the main catalyst chamber 1 and supported thereby is a heat exchanger 8, attached by means of the mounting flange 9 at the top of the heat exchanger. The heat exchanger 8 has at the top and at the bottom thereof a pair of tube-supporting panels 10 and 11, respectively, the panels supporting therebetween a plurality of tubes 12 extending along the longitudinal axis of the neutralizer and arranged, in succession, along a helical line (FIG. 2). Extending laterally of the tubes 12 and tangentially in respect of the periphery of the above-mentioned helical line is the longitudinal axis of a burner device 13 (FIGS. 1 and 2) mounted within a tubular casing 14 welded to the neutralizer housing 2. The discharge end of the burner device 13 is formed by another tubular member 15 welded to the body of the heat exchanger 8. The above described arrangement of the tubes of the heat exchanger and of the burner device minimizes the aerodynamic resistance of the heat exchanger structure. The burner device 13 includes a substantially spherical combustion chamber 16, into which a plurality of liquid fuel jet nozzles 17 and an electrical glow plug 18 project. Mounted within the cylindrical tubular housing 19 of the burner device 13 is a flame tube 20 whose external diameter is somewhat smaller than the internal diameter of the housing 19. The inlet end of the housing 19 communicates with a fan or a blower (not shown) which is operated to drive air under pressure into the annular space between the housing 19 and the flame tube 20. A swirl-promoting baffle member 21 (FIG. 1) is mounted at the inlet of the flame tube 20, and openings 22 are formed in the wall of the latter, through which air enters into the flame tube. A conical deflector 23 is mounted inside the flame tube 20, in the path of the stream of the burning fuel-air mixture to stabilize the burning process. The hot combustion products are driven from the burner device 13 into the heat exchanger 8, where they flow along a helical path defined by the succession of the tubes 12 of the heat exchanger. In this manner the tubes 12 are heated to a desired temperature. The now cooled combustion products flow further on downwardly to the outlet conduit 24, which is disposed intermediate of the vertical limits of the neutralizer, below the bottom tube-supporting panel 11 of the heat exchanger, which conduit 24 forms a part of the passageway of these products toward ambient atmosphere.

Exhaust gases are introduced into the neutralizer through an inlet connection 25 (FIGS. 1 and 3) disposed tangentially in respect of the internal wall of the cylindrical housing 2. Disposed between the main catalyst chamber 1 and the heat exchanger 8, on the one hand, and the internal wall of the cylindrical housing 2 of the neutralizer, on the other hand, is an annular separation chamber 26 of a cyclone type. Red-hot particles which are present in the exhaust gases of the engine move along a helical path within this separation chamber 26, gradually descending into the lowermost portion of the neutralizer, toward the heat exchanger 8. After this descent, these particles precipitate to the bottom, which provides better conditions for the functioning of the catalyst 6.

The exhaust gases are then directed into the tubes 12 of the heat exchanger 8, where they are heated by the heat produced by the burner device, the heat being transmitted through the walls of the tubes 12. Thus, any direct contact of the combustion products coming from the burner device and the exhaust gases coming from the engine is prevented.

Within the heat exchanger, the exhaust gases are heated to a temperature of about 350° to 400° C., which is necessary for effective neutralization of carbon monoxide within the main catalyst chamber 1.

From the main catalyst chamber 1, the now harmless exhaust gases travel to the interior of the hollow lid 27 of the neutralizer, wherefrom they pass into ambient atmosphere through the outlet opening 28 in the lid.

Mounted centrally of the lid 27 is a tubular charging conduit 29 which extends downwardly through a corresponding port in the central portion of the top grid 4 of the main catalyst chamber 1. The conduit 29 is used for charging a supply of catalyst into the chamber 1. Normally, the conduit 29 is closed from above with a closure 30.

Disposed in the bottom portion of the neutralizer housing 2 below the heat exchanger 8, is an auxiliary catalyst chamber 31. This chamber is limited from above by a portion 31a of the bottom of the neutralizer housing 2, while the bottom 31b of the auxiliary catalyst chamber 31 is removably attached to the housing 2. A grid 32 serves as the main part of the bottom portion 31b of the auxiliary catalyst chamber 31, the central portion of the grid 32 supporting a gas directing contoured plate 33 whose central area 33a and peripheral area 33b are raised above the grid 32. The plate 33 underlies the outlet conduit 24 of the heat exchanger 8. The portion of the grid 32 which is disposed radially outwardly of the plate 33, i.e. about the plate 33, supports a supply of granulated catalyst 6 which is identical to the catalyst charged into the main catalyst chamber 1. The plate 33 deflects the stream of the combustion products of the burner device, after they have passed through the heat exchanger 8, and distributes these combustion products evenly over the supply of the catalyst 6 on the grid 32. Consequently, the combustion products engage the catalyst 6 at a relatively low speed, whereafter they are neutralized by the action of the catalyst and, finally, leaving the neutralizer structure through the apertures of the grid 32.

What we claim is:

1. An apparatus for neutralizing the exhaust gases of an internal combustion engine by a thermocatalytic action, said apparatus comprising: a housing with an inlet means and an outlet means for exhaust gases; a separation chamber of a cyclone type disposed within said housing downstream of said inlet means in the path of travel of said exhaust gases; a heat exchanger disposed within said housing and communicating with said separation chamber; a burner device coupled to said heat exchanger to introduce combustion gases therein to effect heating of said exhaust gases passing through said heat exchanger, said heat exchanger including conveyor tubes for the passage of the exhaust gases therethrough so that heating of the exhaust gases is effected by the combustion gases indirectly through the tubes, said burner device having a longitudinal axis, said conveyor tubes of said heat exchanger extending laterally in respect of said longitudinal axis and being arranged in succession along a substantially helical line, said longitudinal axis extending tangentially in respect of the periphery of said helical line, a chamber containing a catalyst, the latter chamber being disposed within said housing upstream of said outlet means for said exhaust gases, and communicating with said heat exchanger for receiving said exhaust gases from said heat exchanger for neutralizing same; and an outlet conduit in said heat exchanger to receive the combustion products of said burner device, said outlet conduit being in communication with the ambient atmosphere.

2. A neutralizing apparatus as claimed in claim 1 comprising an auxiliary chamber adapted to contain an auxiliary supply of a catalyst, said auxiliary chamber being disposed in said outlet conduit of said heat exchanger which receives the combustion products from said burner device.

3. A neutralizing apparatus as claimed in claim 2 wherein said auxiliary chamber comprises a grid adapted to support said catalyst, said grid being located downstream of said outlet conduit of said heat exchanger and a gas directing contoured plate-like element mounted between said grid and said outlet conduit, said platelike element including a central portion and a peripheral portion raised above said grid.

References Cited

UNITED STATES PATENTS

| | | | |
|---|---|---|---|
| 2,898,201 | 8/1959 | Hayes | 23—288 F |
| 3,013,628 | 12/1961 | Jacobs et al. | 23—288 FX |
| 3,056,662 | 10/1962 | Ridgway | 23—288 F |
| 3,132,473 | 5/1964 | Hass | 23—288 FX |
| 3,162,518 | 12/1964 | Thomas et al. | 23—288 FX |
| 3,197,955 | 8/1965 | Cohn et al. | 23—288 FX |
| 3,273,971 | 9/1966 | Baddorf et al. | 23—288 F |
| 3,397,034 | 8/1968 | Tulleners et al. | 23—288 FX |
| 3,485,593 | 12/1969 | Lenane et al. | 23—288 F |
| 3,503,716 | 3/1970 | Berger | 23—288 F |

FOREIGN PATENTS

| | | | |
|---|---|---|---|
| 1,012,076 | 12/1965 | Great Britain | 23—288 F |

MORRIS O. WOLK, Primary Examiner

B. S. RICHMAN, Assistant Examiner

U.S. Cl. X.R.

23—2 E, 277 C; 60—29 A; 165—159